Aug. 27, 1946.     O. L. BEARDSLEY     2,406,343
NUT AND SCREW MECHANISM
Filed June 21, 1944     3 Sheets-Sheet 1

Inventor
ORIE L. BEARDSLEY,

By C. E. Herrstrom & H. E. Thibodeau
Attorneys

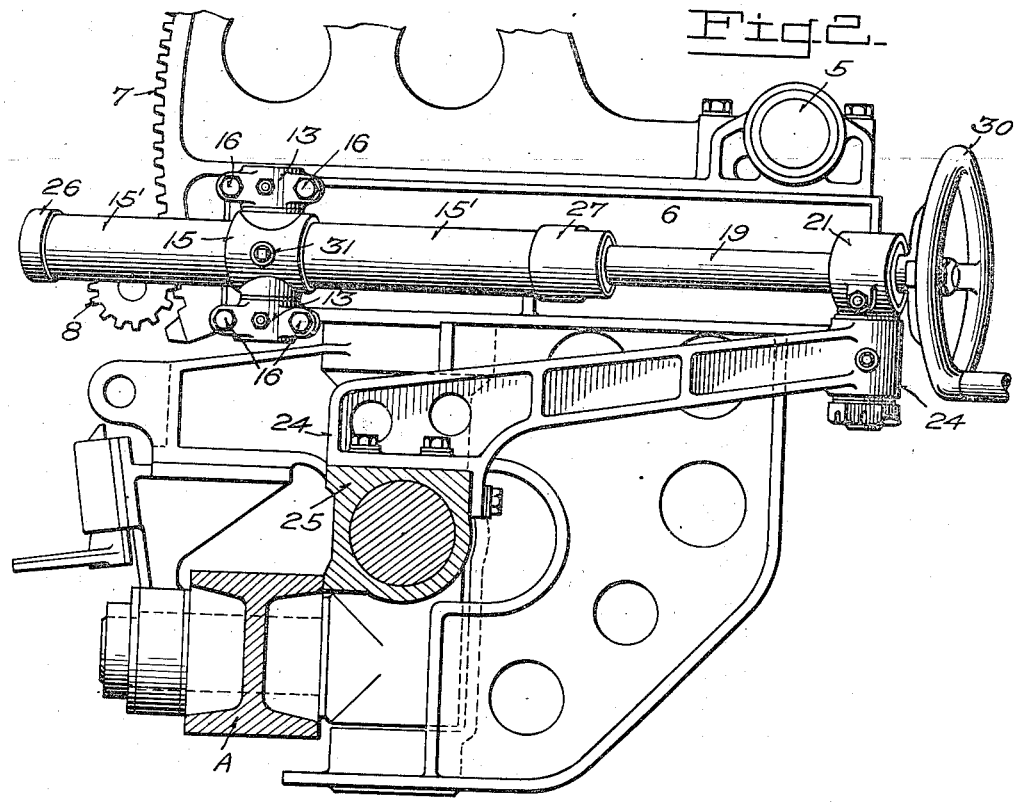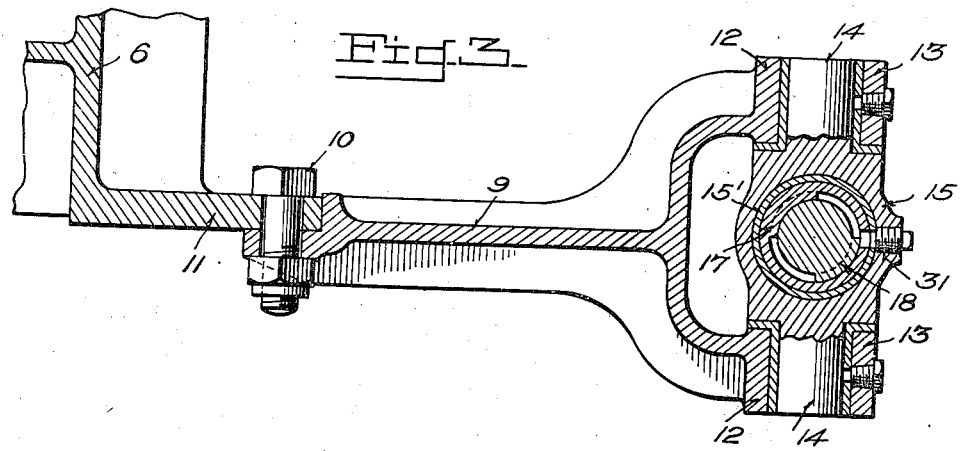

Aug. 27, 1946.　　　　O. L. BEARDSLEY　　　　2,406,343
NUT AND SCREW MECHANISM
Filed June 21, 1944　　　　3 Sheets-Sheet 3
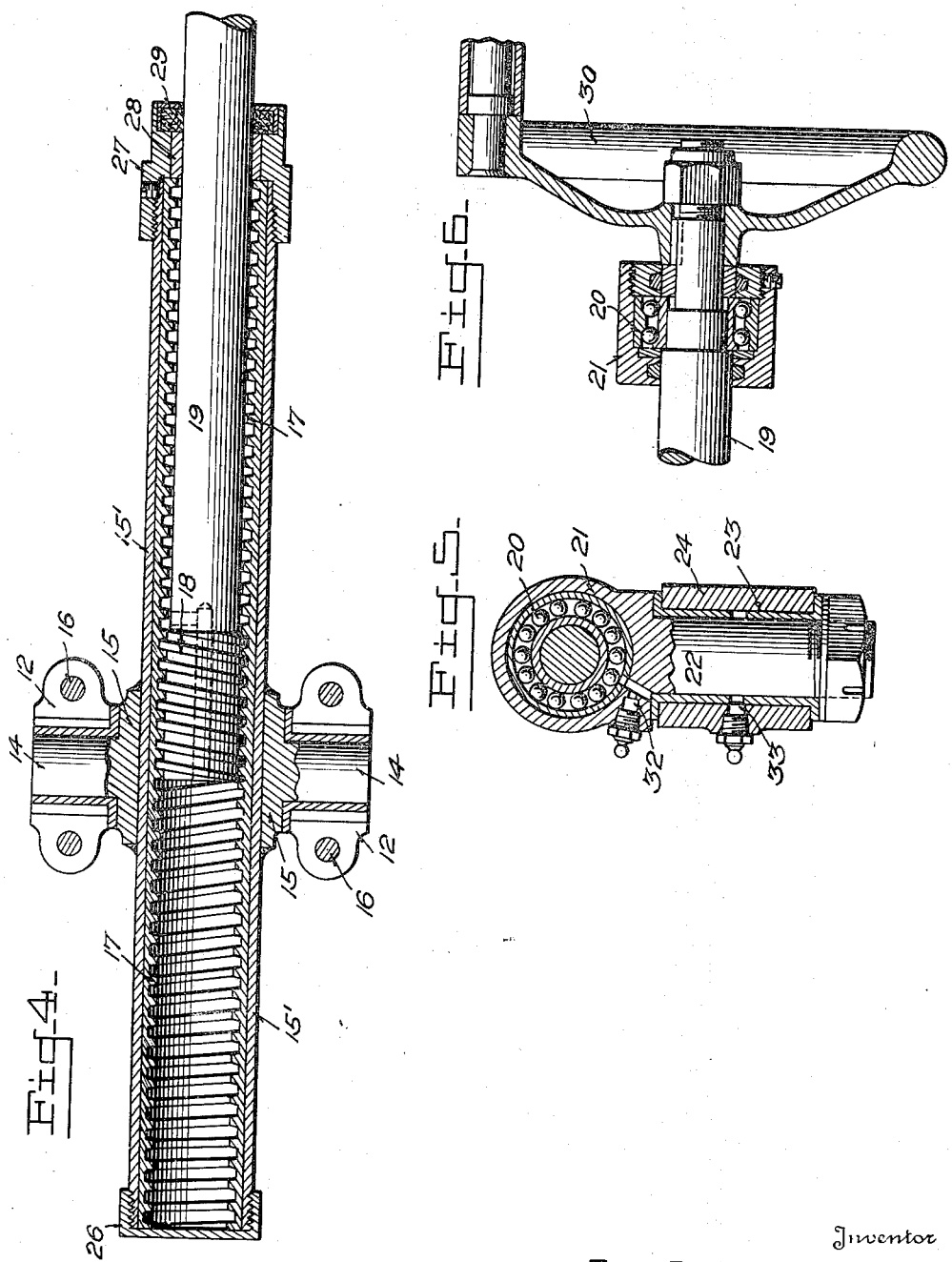
Inventor
ORIE L. BEARDSLEY,
By C. E. Herrstrom & H. E. Thibodeau
Attorney Patented Aug. 27, 1946

2,406,343

UNITED STATES PATENT OFFICE 2,406,343

NUT AND SCREW MECHANISM

Orie L. Beardsley, Washington, D. C.

Application June 21, 1944, Serial No. 541,406

5 Claims. (Cl. 89—41)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a nut and screw mechanism particularly adapted for use in connection with artillery guns, and howitzers, to traverse or train the same in azimuth.

The mechanism now in use for traversing these guns comprises a laterally extending rack segment secured to the gun top carriage and operated by a worm on a shaft mounted on a bracket secured to the equalizing support carried by the wheel axle, there being a hand wheel carried by the shaft for operating the worm. It is this mechanism upon which I seek to improve and the object is to provide a traversing mechanism by which the gun may be quickly, smoothly accurately, and easily trained in azimuth, and one that will be durable and reliable in operation, and which involves a construction in which the moving parts are protected from the weather and from the entry of foreign material likely to interfere with the operation of the mechanism. The invention contemplates the provision of an elongated nut of cast metal, preferably babbitt, the nut being cast around a mandril the exact counterpart of the screw that cooperates with the nut in traversing the gun, thus assuring an accurate fit between the threads of the nut and the threads of the screw. This is an important feature of the invention because it completely prevents or reduces to a minimum the "back lash" incident to a traversing mechanism employing a machined rack and a machined worm or screw. For the accomplishment of the above mentioned objects and others that will become apparent in the course of the following description, I provide a support on top carriage with a laterally extending bracket and mount in a swivel device carried by the bracket, a cylinder containing an elongated nut, replacing the traversing rack of the former construction, cooperated with by a screw carried by a shaft mounted in a swivel device carried by another bracket secured to the equalizing support of the gun mounting organization, and provide the shaft with a hand wheel for rotating the screw in the nut, the screw replacing the traversing worm of the former construction.

In the drawings illustrating the invention:

Figure 2 is a vertical section on the line 2—2 of Figure 1, the gun portion being omitted.

Figure 3 is a central section through the nut and swivel, on line 3—3 of Figure 1.

Figure 4 is a longitudinal central section through the nut and swivel, on line 4—4 of Figure 1, showing the screw and a portion of its shaft in elevation.

Figure 5 is a vertical section through the screw shaft swivel.

Figure 6 is a detail horizontal section view of the screw shaft swivel showing the manner of mounting the shaft and hand wheel.

Figure 1:
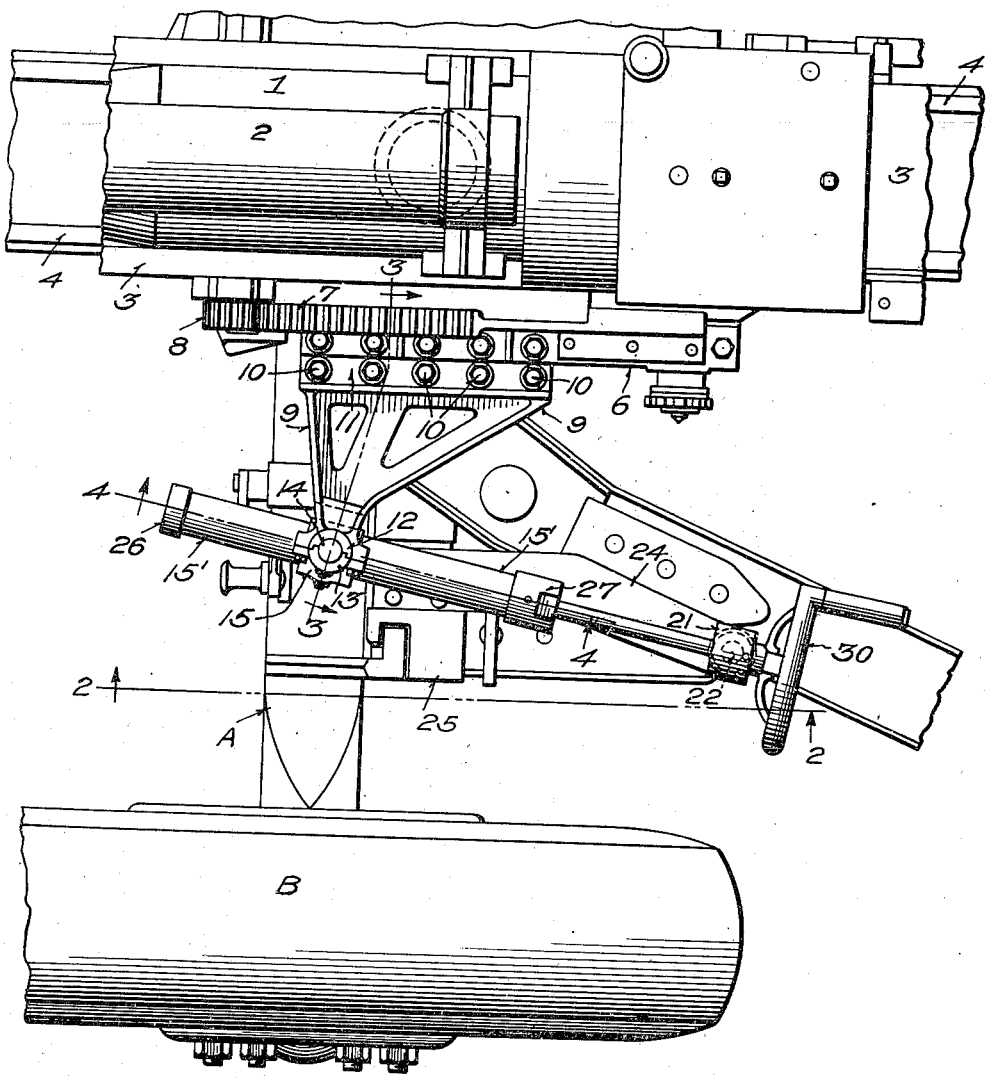
Figure 1 is a top plan view of the breech portion of a howitzer and part of its carriage, with the improved traversing mechanism associated therewith.

Referring to the drawings A designates the gun carriage wheel axle and B a wheel carried thereby. This axle carries the "equalizing support" that carries many of the parts of the gun organization, only a few of which are shown and will be described, enough to show the connection of the present invention with them, since they form no part of the present invention.

The numeral 1 designates the howitzer barrel or tube which carries the recuperator cylinder number 2. The tube is carried by a sleigh 3, which in turn is carried by the trough shaped cradle 4 which supports the recoiling parts and upon which the sleigh moves in recoil and counter-recoil. The cradle is provided with the usual trunnions mounted in cradle trunnion bearings 5 in the top carriage assembly 6, which carriage moves in the traverse of the gun, but not in its elevation.

The numeral 7 designates the left hand elevating segment or arc engaged by a pinion 8 on a cross shaft which has at its other end a gear through which power is applied to the opposite arc and transmitted to the one shown, the shaft being operated by a hand wheel appropriately turned to train the gun in elevation. The top carriage pivots about and is supported by the usual pintle group assembly and carries the traversing rack, and as stated moves only in azimuth.

The parts of the organization before mentioned are usual and constitute no part of the present invention, except in so far as any of them may form an element in a legitimate combination with those about to be described.

I propose to replace the usual traversing rack and worm by the mechanism illustrated, in which the numeral 9 indicates a bracket bolted, as by bolts 10, to a flange 11 carried by the top carriage 6. The outer end of the bracket is bifurcated and provided with upper and lower half-bearings 12 which in cooperation with similar bearing parts 13, form bearings for the trunnions 14 of a swivel device including a sleeve 15 brazed, welded, or otherwise secured to an elongated cylinder 15' the bearing halves 12 and 13, being held in swivel engagement with the sleeve trunnions by bolts 16. Within the cylinder is an elongated nut 17 non-rotatably held therein and engaged by a screw 18 carried by the screw shaft 19, whose other end has a bearing in a ball bearing assembly 20 in a swivel device including a sleeve 21. The sleeve has integral therewith, a shank 22 extending through a bore 23 in a bracket 24 bolted to the equalizing support 25.

The cylinder 15' is closed at one end by a cap 26, and threaded on its opposite end is a stuffing box 27, through which the shaft passes, comprising a ring 28 preferably of a babbitt metal and a ring 29 of packing material. The outer end of the shaft 19 has keyed to it the hand wheel 30, whose hub abuts the outer face of the sleeve 29.

The cylinder 15' is, as stated, closed at both ends, one end by the cap 26 and the other by stuffing box 27 and shaft 19. Consequently the provision has been made for by-passing of air or lubricant or both from one side of the screw to the other, and this is in the way of a passage drilled into the inner end of the shaft for the length of the screw, which passage is intersected beyond the screw by a hole leading to the threads of the nut beyond the screw, as shown in dotted lines in Fig. 2.

The trunnion bearings in the bifurcated bracket 9 and the bearing of the shank 22 of the shaft bearing sleeve, are preferably lined with babbitt or other friction reducing metal.

The cylinder bearing sleeve 15 is provided with an aperture 31 for the introduction lubricant. Oil openings 32, 33 are provided, respectively, for the shaft bearing sleeve 21, and for the shank 22 of said sleeve.

Obviously, when the hand wheel 30 is rotated in one direction or the other, the screw 18, will be correspondingly moved in the nut and the cradle carriage and consequently, the cradle and gun will be traversed, the swivel mounting of the nut and screw shaft permitting such action.

As stated in the forepart of this specification the nut is preferably cast of suitable metal on a mandril that corresponds exactly with the threads of the nut, thus necessarily assuring an accurate fit between the nut threads and those of the screw when a screw, the duplicate of the mandril is employed in cooperation with the nut.

The machining of the rack, the worm, or screw of the former construction involved expensive and time consuming operations which are eliminated by the instant method of construction, it being obvious that the castings operations can be much more expeditiously performed than those otherwise required.

I claim:
1. In a gun having a bottom carriage and a top carriage pivoted thereon for azimuth movement, a mechanism for traversing the gun, comprising a laterally extending bracket rigidly secured to the top carriage, a swivel device carried by said bracket, an elongated nut rigidly secured to the swivel device, a screw having threads wholly inclosed in the nut and accurately matching said threads and cooperating with them to swing the nut on the swivel device, a second swivel device mounted independently of the first, a shaft connected with the screw and having a bearing in the second swivel device, and means for rotating the screw to traverse the gun.

2. The invention of claim 1 characterized in that the elongated nut is closed at both ends.

3. In a gun having a bottom carriage and a top carriage pivoted thereon for azimuth movement, a mechanism for traversing the gun, comprising a laterally extending bracket rigidly secured to the top carriage, a swivel device including a sleeve carried by said bracket, an elongated nut closed at both ends and rigidly secured to said sleeve, a screw having threads wholly inclosed in the nut and accurately matching the threads in said nut and cooperating them to swing the nut on the swivel device, a second swivel device including a sleeve and mounted independently of the first, a shaft connected with the screw and having a bearing in the sleeve of the second swivel device, and means for rotating the shaft and thereby the screw to traverse the gun.

4. In a gun having a bottom carriage and a top carriage pivoted thereon for azimuth movement, a mechanism for traversing the gun, comprising a laterally extending bracket secured to the top carriage and having a bifurcated outer end having trunnion bearings therein, a sleeve positioned between the bifurcated ends of the bracket and having trunnions thereon having bearings in said trunnion bearings, said sleeve, bearings and trunnions constituting a swivel device, an elongated nut rigidly mounted in the sleeve, a shaft having a screw on its inner end having threads accurately matching the threads of the nut and cooperating with them to swing the nut when the shaft is rotated, a second swivel device mounted independently of the first and forming a bearing for the outer end of the shaft, and means for rotating the shaft and thereby the screw, to traverse the gun.

5. The invention of claim 3 characterized in that there is means for establishing communication between the portions of the nut on either side of the screw for the passage of fluid contents of the nut during the movement of the screw.

ORIE L. BEARDSLEY.